United States Patent [19]
Ehrlich

[11] 3,839,698
[45] Oct. 1, 1974

[54] TRANSDUCER COMPENSATION NETWORK

[75] Inventor: Stanley L. Ehrlich, Middletown, R.I.

[73] Assignee: Raytheon Company, Lexington, Mass.

[22] Filed: May 29, 1973

[21] Appl. No.: 364,569

[52] U.S. Cl. .................................... 340/9, 310/8.1
[51] Int. Cl. ........................................ H04b 13/00
[58] Field of Search ........... 340/8, 9, 10, 11, 12, 13, 340/8 PC, 8 MM; 310/8.1, 9.6, 9.8

[56] References Cited
UNITED STATES PATENTS

| | | | |
|---|---|---|---|
| 2,416,337 | 2/1947 | Mason | 340/10 X |
| 2,859,346 | 11/1958 | Firestone et al. | 310/9.8 X |
| 3,187,300 | 6/1965 | Brate | 340/10 |
| 3,321,738 | 5/1967 | Trott | 340/10 |

Primary Examiner—Samuel Feinberg
Assistant Examiner—H. J. Tudor
Attorney, Agent, or Firm—David M. Warren; Joseph D. Pannone; Milton D. Bartlett

[57] ABSTRACT

Circuitry for coupling sonar transducers to a signal generator, the circuitry comprising inductive elements for resonating with a capacitor of the equivalent circuit of each segment of the sonar transducer. In alternate segments, the inductive element is coupled serially between the signal generator and the transducer segment, while in the remaining transducer segment, the inductive element is coupled in parallel with the terminals of the transducer segment. This provides for a compensation of any changes in the transducer characteristics affecting the electrical equivalent circuit of the transducer segments since a shift in capacitance in the serially tuned circuits provides a reactance change of opposite sign to the reactance change occurring in the parallel tuned circuits thereby minimizing any impedance changes presented to the terminals of the signal generator.

3 Claims, 1 Drawing Figure

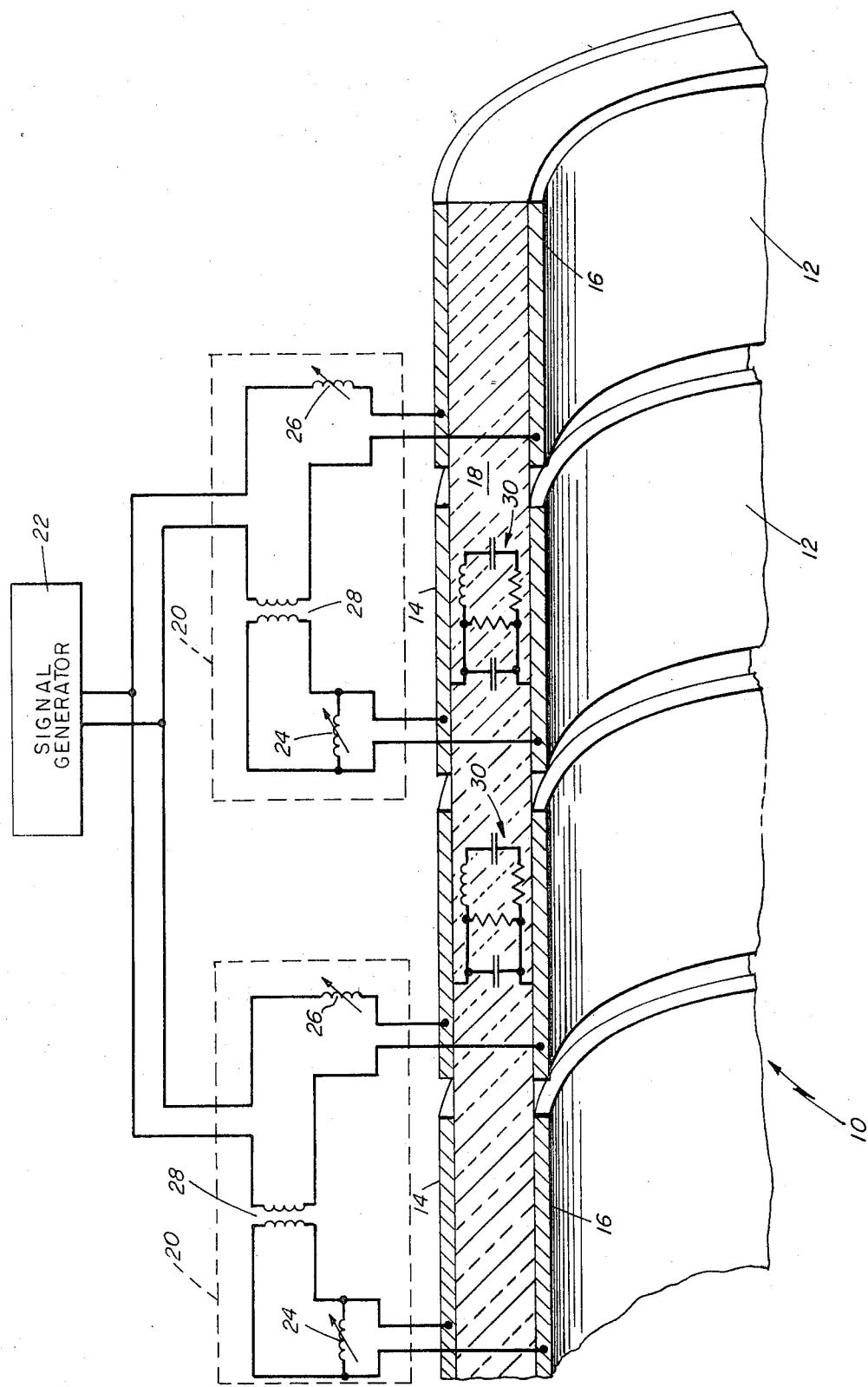

TRANSDUCER COMPENSATION NETWORK

BACKGROUND OF THE INVENTION

Sonar transducers are frequently operated under conditions of changing hydrostatic pressure, changing temperature and changing electrical power level, the hydrostatic pressure varying with the depth of the transducer assembly, the temperature varying both because of the temperature of the medium in which the transducer assembly is placed as well as from heat developed by the operation of the transducer itself, and the electrical power level varying with power source variation, programmed input and/or operator adjustment. Aging also affects the values of the parameters of the well-known equivalent circuit of the ceramic segments from which transducer assemblies are frequently manufactured.

A problem occurs in that it is sometimes desirable to couple all of the available output power of a signal generator into the various segments of the transducer assembly. However, such maximum power transfer necessitates the tuning of the signal generator to the impedance presented by the transducer segment. In the event that the parameters of the transducer segment is altered by virtue of hydrostatic pressure, temperature, or input power level, the aforementioned impedance match between the signal generator and the transducer segments is disturbed so that maximum power is no longer transferred.

SUMMARY OF THE INVENTION

The foregoing problem and other advantages are provided by a compensation network, in accordance with the invention, wherein inductive elements are serially connected with terminals of, preferably, alternate segments of a transducer assembly for serially tuning the capacitance of the equivalent circuit of the transducer segments for a resonance at the operating frequency. The other transducer segments are similarly tuned but with an inductive element that is connected in parallel with the input terminals of the equivalent circuit. The tuned circuits are then coupled together so that changes in the reactances due to changes in the characteristics of the transducer segments tend to cancel each other. In one embodiment of the invention, transformers are preferably coupled between the signal generator and each of the transducer segments to equalize the electric field appearing across the parallel tuned segments with that of the series tuned segments. The compensation of the reactance shifts minimize any changes in impedance presented to the signal generator so that the signal generator remains tuned to the transducer assembly for coupling maximum power thereto even though the ceramic material of the transducer assembly may undergo changes in its parameters due to hydrostatic pressure and temperature changes resulting from being submerged in a fluid medium.

BRIEF DESCRIPTION OF THE DRAWING

The aforementioned aspects and other features of the invention are explained in the following description taken in connection with the accompanying drawing which shows a cut-away section of a transducer assembly with the electrical circuits of the invention being coupled to individual sections of the transducer assembly.

DESCRIPTION OF THE PREFERRED EMBODIMENT

Referring now to the FIGURE, there is seen a portion of a transducer assembly 10 which, by way of example, is a cylindrical assembly comprising coaxial segments 12 in the shape of rings, each of which comprises a pair of electrodes 14 and 16, bonded to the outer surfaces of the ceramic material 18 of the transducer assembly 10. Pairs of the segments 12 are coupled via circuits 20 to a signal generator 22 which provides suitable signals for energizing the segments 12. Each of the circuits 20 comprises inductors 24 and 26 with each inductor 24 being connected in parallel across the pair of electrodes 14 and 16 of a segment 12 while the inductor 26 is connected in series with one of the electrodes such as the electrode 14 of the adjacent segment 12 of the pair of segments 12. Also, shown in each circuit 20 is a transformer 28 having a turns ratio approximately equal to the Q of the resonant circuit comprising the inductor 26 and the equivalent circuit 30 of a segment 12 to which it is connected. Each of equivalent circuits 30 which, for convenience, is depicted superposed upon individual ones of the segments 12 is a well-known circuit comprising a combination of a serially interconnected inductor, capacitor and resistor which is connected across the terminals of the combination of the parallel interconnection of a capacitor and resistor. For example, if the interconnection of the inductor 26 with the equivalent circuit 30 provides a Q having a value of 10, then the transformer 28 would be a step-up transformer having a turns ratio of 10 to equalize the electric field at resonance appearing between the electrodes 14 and 16 of adjacent segments 12.

As is well known from electrical circuit theory, the series tuning of the inductor 26 with the input capacitance of the equivalent circuit 30 provides a positive reactance at frequencies above the resonance frequency while the parallel tuning from the inductor 24 with this capacitance provides a negative reactance at frequencies above the resonance frequency. The inductors 24 and 26 are shown in this embodiment as being variable inductors to permit each segment 12 to be individually tuned to the same resonance frequency. Thus, any shift in the resonance frequency results in the appearance of a positive and negative reactive component in each circuit 20 which tend to cancel so that each circuit 20 presents an impedance to the signal generator 22 which is substantially invariant to shifts in resonance frequency such as may be caused by hydrostatic pressure or temperature variation of the ceramic material 18 which occurs upon the submergence of the transducer assembly 10 in a fluid medium. In this way, the signal generator 22 remains tuned to the transducer assembly 20 in spite of changes which may occur to the characteristics of the ceramic material 18. This permits the transducer assembly 10 to be utilized in well-known sonar applications in which the transducer assembly 10, by way of example, may be towed behind a ship at varying depths in the ocean waters while experiencing changes in pressure and temperature, but still maintaining a maximum power transfer from the signal generator 22 to the transducer assembly 10 since any tendancy for an individual segment 12 to become detuned is compensated by means of the circuits 20.

It is understood that the above-described embodiment of the invention is illustrative only in that modifications thereof will occur to those skilled in the art. Accordingly, it is desired that this invention is not to be limited to the embodiment disclosed herein but is to be limited only as defined by the appended claims.

What is claimed is:

1. A transducer system comprising:
   a plurality of transducer segments, each of which comprises electrodes for coupling electrical signals to the transducer segments;
   at least one first inductor and at least one second inductor, each of said first inductors being coupled to individual ones of the transducer segments in a group of said plurality of transducer segments, each of said second inductors being coupled to individual ones of the remaining ones of said transducer segments;
   said first inductors being coupled in parallel to the electrodes of the individual ones of the transducer segments in said group of transducer segments;
   said second inductors being coupled in series with the electrodes of said remaining ones of said transducer segments; and
   at least one transformer corresponding to each of said first inductors, each of said transformers having a first winding and a second winding, said first winding in each of said transformers being coupled in parallel with respective ones of said first inductors, said second winding in each of said transformers being coupled in series with respective ones of said second inductors, each of said transformers having a turns ratio of said first winding to said second winding suitable for compensating changes in reactance associated with each interconnection of said first inductor and said second inductor with its respective transducer segment.

2. A system according to claim 1 wherein said transformer increases the voltage appearing across one of said first inductors relative to the voltage appearing across the serial combination of one of said second inductors and its transducer segment.

3. A system according to claim 2 wherein said segments are coupled in pairs, each of said pairs including a segment coupled to one of said first inductors and a segment coupled to one of said second inductors, an input of said transformer being serially connected with said second inductor of said pair.

* * * * *